US010457820B2

(12) United States Patent
Oya et al.

(10) Patent No.: US 10,457,820 B2
(45) Date of Patent: *Oct. 29, 2019

(54) ALCOHOL-BASED PRINTING INK COMPOSITION

(71) Applicants: TOYO INK SC HOLDINGS CO., LTD., Chuo-ku (JP); TOYO INK CO., LTD., Chuo-ku (JP)

(72) Inventors: Toru Oya, Chuo-ku (JP); Yuki Sato, Chuo-ku (JP); Yoshitaka Tone, Chuo-ku (JP); Harunori Narihiro, Chuo-ku (JP)

(73) Assignees: TOYO INK SC HOLDINGS CO., LTD., Chuo-ku (JP); TOYO INK CO., LTD., Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/411,337

(22) PCT Filed: Jun. 27, 2013

(86) PCT No.: PCT/JP2013/067616
§ 371 (c)(1),
(2) Date: Dec. 24, 2014

(87) PCT Pub. No.: WO2014/003102
PCT Pub. Date: Jan. 3, 2014

(65) Prior Publication Data
US 2015/0197649 A1 Jul. 16, 2015

(30) Foreign Application Priority Data
Jun. 27, 2012 (JP) ................... 2012-143658

(51) Int. Cl.
*C09D 11/033* (2014.01)
*C09D 11/102* (2014.01)
*D21H 19/42* (2006.01)

(52) U.S. Cl.
CPC .......... *C09D 11/033* (2013.01); *C09D 11/102* (2013.01); *D21H 19/42* (2013.01); *Y10T 428/24802* (2015.01)

(58) Field of Classification Search
CPC .... C09D 11/033; C09D 11/102; D21H 19/42; Y10T 428/24802
See application file for complete search history.

(56) References Cited

U.S. PATENT DOCUMENTS

| | | | |
|---|---|---|---|
| 3,723,372 A * | 3/1973 | Wakimoto et al. | C08G 18/8061 524/315 |
| 6,406,143 B1 | 6/2002 | Chen et al. | |
| 9,523,009 B2 * | 12/2016 | Oya | C09D 11/033 |
| 2009/0246484 A1 * | 10/2009 | Kumagai | C09D 11/30 428/201 |
| 2010/0022662 A1 | 1/2010 | Goebelt et al. | |
| 2010/0233368 A1 | 9/2010 | Zhu et al. | |
| 2010/0255317 A1 * | 10/2010 | Saito | C08G 18/0895 428/425.5 |
| 2013/0289185 A1 | 10/2013 | Oya et al. | |

FOREIGN PATENT DOCUMENTS

| | | |
|---|---|---|
| CN | 101842406 A | 9/2010 |
| JP | 6 100817 | 4/1994 |
| JP | 9 328646 | 12/1997 |
| JP | 2002 121250 | 4/2002 |
| JP | 2002 293860 | 10/2002 |
| JP | 3779487 B2 * | 3/2006 |
| JP | 2009-173862 * | 8/2009 |
| JP | 2010 53194 | 3/2010 |
| JP | 2010 514863 | 5/2010 |
| JP | 2010 144075 | 7/2010 |
| JP | 2010 241924 | 10/2010 |
| WO | 2012 008339 | 1/2012 |

OTHER PUBLICATIONS

Office Action with Search Report dated Dec. 31, 2015 in Canadian Patent Application No. 2,877,846.
Combined Office Action and Search Report dated Feb. 4, 2016 in Chinese Patent Application No. 201380033811.5 (with English translation).
Combined Chinese Office Action and Search Report dated Sep. 6, 2015 in Patent Application No. 201380033811.5 (with English language translation).
U.S. Appl. No. 13/976,742, filed Jun. 27, 2013, US2013/0289185 A1, Oya, et al.
International Search Report dated Aug. 13, 2013 in PCT/JP13/067616 Filed Jun. 27, 2013.
International Search Report dated Apr. 3, 2012 in PCT/JP11/80293 filed Dec. 27, 2011.
International Preliminary Report on Patentability and Written Opinion dated Jul. 11, 2013, in PCT/JP2011/080293 filed Dec. 27, 2011 (submitting English translation only).
Combined Chinese Office Action and Search Report dated Mar. 26, 2014 in Patent Application No. 201180062980.2 (with English language translation).

(Continued)

*Primary Examiner* — Rabon A Sergent
(74) *Attorney, Agent, or Firm* — Oblon, McClelland, Maier & Neustadt, L.L.P.

(57) ABSTRACT

The present invention relates to an alcohol-based printing ink composition, comprising a colorant (E), a medium and a polyurethane urea resin (D) obtained by reacting a polyol (A), a diisocyanate (B) and a chain extender (C), wherein the polyol (A) comprises a polyester polyol (A0) having a repeating unit derived from a saturated hydroxycarboxylic acid having a side chain, and the medium comprises an alcohol (F), wherein the proportion of the alcohol (F) is at least 50% by weight relative to a value of 100% by weight for the total medium. Accordingly, the invention provides a printing ink comprising an alcohol having minimal environmental impact as the main component of the ink medium, the ink exhibiting excellent colorant dispersibility and storage stability, and having excellent re-solubility during long runs.

18 Claims, No Drawings

(56) References Cited

OTHER PUBLICATIONS

International Preliminary Report on Patentability and Written Opinion dated Jan. 8, 2015, in PCT/JP2013/067616 (submitting English language translation only).
Office Action dated Mar. 17, 2016 in U.S. Appl. No. 13/976,742.
Mexican Office Action dated Mar. 20, 2019 in Mexican Patent Application No. MX/a/2015/000047 (with English translation), 8 pages.
Mexican Office Action dated Sep. 19, 2018 in Mexican Patent Application No. MX/a/2015/000047 (submitting English translation only), 3 pages.

* cited by examiner

ALCOHOL-BASED PRINTING INK COMPOSITION

TECHNICAL FIELD

The present invention relates to an alcohol-based printing ink composition.

BACKGROUND ART

In recent years, more stringent regulations and appreciation of environmental preservation or safety factors have lead to increased demands for a reduction in the use of petroleum-based materials for printing ink solvents, and a reduction in $CO_2$ emissions. Further, bio solvents are attracting much attention, and among such solvents, the effective utilization of bioethanol, which has minimal environmental impact, holds considerable promise. Conventionally, solvents such as toluene, methyl ethyl ketone and ethyl acetate and the like have been used favorably as printing ink media, but Patent Literature 1 discloses the use of a dispersion of titanium white in which ethanol is the main component of the solvent.

However, printing inks containing an alcohol as the main solvent require that the binder resin is made alcohol-soluble, namely is hydrophilized. As a result, the compatibility between the titanium white, which has a hydrophilic particle surface, and the hydrophilized binder resin can be maintained. However, in the case of an organic pigment such as a copper phthalocyanine cyan pigment for which the surface is hydrophobic, a problem arises in that the compatibility with the hydrophilized binder resin deteriorates, making it difficult to ensure good dispersion stability for the pigment.

Further, when pigment dispersion is problematic using only a binder resin, a dispersant is generally also added to the ink. However, chlorine-based resins such as vinyl chloride-vinyl acetate copolymers, which are conventionally widely used dispersants in solvent-based inks, are insoluble in alcohols. Further, among known non-chlorine-based dispersants, there are no effective dispersants that exhibit satisfactory levels of pigment dispersibility and printability.

On the other hand, alcohol solvents also have other drawbacks, including having slower volatilization rates, and consequently inferior productivity, compared with solvents such as toluene, methyl ethyl ketone and ethyl acetate that are used in conventional solvent-based inks. Accordingly, although providing inferior environmental preservation, in order to maintain good productivity, Patent Literature 2 discloses a method in which an ester-based solvent is used in combination with an alcohol solvent as a printing ink medium.

By using an ester-based solvent in combination with an alcohol solvent, vinyl chloride-vinyl acetate copolymers which are insoluble in the alcohol can be dissolved, and good pigment dispersion stability can be ensured. However, when two solvents having very different volatilization rates are combined, such as ethanol and ethyl acetate, the solvent composition within the ink during the printing process changes on the plate cylinder, with the proportion of the ethanol component that has a slower volatilization rate temporarily increasing, and therefore a problem may arise in which the vinyl chloride-vinyl acetate copolymer precipitates, resulting in inadequate re-solubility, particularly during long runs.

Similarly, even when a non-chlorine-based dispersant is used in combination with an alcohol solvent, ensuring a satisfactory state of pigment dispersion and adequate re-solubility across the entire range of the continually changing alcohol-based solvent composition has proven difficult.

CITATION LIST

Patent Literature

PLT 1: JP 2002-293860 A
PLT 2: JP 2010-144075 A

SUMMARY OF INVENTION

Technical Problem

The present invention has an object of providing a printing ink comprising an alcohol having small environmental impact as the main component of the ink medium, the ink exhibiting excellent colorant dispersibility and storage stability, and having excellent re-solubility during long runs.

Solution to Problem

The present invention relates to (1) an alcohol-based printing ink composition, comprising a colorant (E), a medium and a polyurethane urea resin (D) obtained by reacting a polyol (A), a diisocyanate (B) and a chain extender (C), wherein the polyol (A) comprises a polyester polyol (A0) having a repeating unit derived from a saturated hydroxycarboxylic acid having a side chain, and the medium comprises an alcohol (F), wherein the proportion of the alcohol (F) is at least 50% by weight relative to a value of 100% by weight for the total medium.

Moreover, the present invention also relates to (2) the alcohol-based printing ink composition according to (1), wherein the polyester polyol (A0) is a hydrogenated castor oil polyol (A1).

Further, the present invention also relates to (3) the alcohol-based printing ink composition according to (1) or (2), wherein the polyol (A) further comprises a polyether polyol (A2).

Furthermore, the present invention also relates to (4) the alcohol-based printing ink composition according to any one of (1) to (3), wherein the proportion of the polyester polyol (A0) is from 20 to 85% by weight relative to a value of 100% by weight for the total polyol (A).

Further, the present invention also relates to (5) the alcohol-based printing ink composition according to any one of (1) to (4), wherein the alcohol (F) comprises ethanol, and the proportion of the ethanol is at least 70% by weight relative to a value of 100% by weight for the total alcohol (F).

Moreover, the present invention also relates to (6) the alcohol-based printing ink composition according to any one of (1) to (5), wherein the medium comprises water, and the proportion of water is from 2 to 20% by weight relative to a value of 100% by weight for the total medium.

The subject matter of the present invention is related to the subject matter disclosed in prior Japanese Application 2012-143658 filed on Jun. 27, 2012, the entire contents of which are incorporated herein by reference.

Advantageous Effects of Invention

The present invention is able to provide a printing ink which comprises an alcohol as the main component of the ink medium, and exhibits excellent colorant dispersibility and storage stability, as well as excellent re-solubility during long-run printing.

DESCRIPTION OF EMBODIMENTS

Embodiments of the present invention are described below in detail, but the compositional elements described below are merely examples (representative examples) of embodiments of the present invention, and the present invention is not limited by the content of these embodiments as long as within the scope of the gist of the present invention.

The alcohol-based printing ink composition of the present invention comprises a polyurethane urea resin (D), a colorant (E), and a medium, wherein the polyurethane urea resin (D) is obtained by reacting a polyol (A), a diisocyanate (B) and a chain extender (C), the polyol (A) comprises a polyester polyol (A0) having a repeating unit derived from a saturated hydroxycarboxylic acid having a side chain, and the medium comprises an alcohol (F), wherein the proportion of the alcohol (F) is at least 50% by weight relative to a value of 100% by weight for the total medium.

First is a description of the polyol (A).

The polyol (A) of the present invention comprises a polyester polyol (A0) having a repeating unit derived from a saturated hydroxycarboxylic acid having a side chain (hereafter also referred to as simply "the polyester polyol").

The polyester polyol (A0) having a repeating unit derived from a saturated hydroxycarboxylic acid having a side chain is a polyol having two or more structures represented by the following general formula (1) within a single molecule, and also having an ester linkage.

General Formula (1)

[Chemical Formula 1]

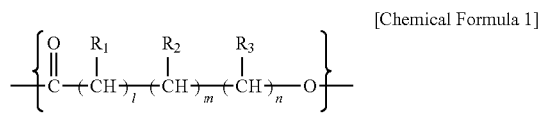

(Each of $R_1$ to $R_3$ independently represents a hydrogen atom or an alkyl group having a carbon number of 1 or greater, and all of $R_1$ to $R_3$ may be mutually different or two or more may be the same, provided that at least one of $R_1$ to $R_3$ represents an alkyl group having a carbon number of 1 or greater, and each of 1, m and n independently represents an integer of 1 to 20.)

The production method used for obtaining the polyester polyol (A0) is not limited to the following examples, but the polyester polyol (A0) can be obtained, for example, using a method in which a saturated hydroxycarboxylic acid having a side chain is esterified using a diol or a diamine as an initiator, or a method in which a lactone having a side chain is subjected to a ring-opening polymerization using a diol or a diamine as an initiator.

The side chain of the polyester polyol (A0) preferably has a carbon number of 3 to 20, and more preferably a carbon number of 4 to 10. When the carbon number is at least 3, satisfactory pigment dispersibility can be obtained, and when the carbon number is not more than 20, the re-solubility is favorable.

Although not limited to the following examples, specific examples of the saturated hydroxycarboxylic acid having a side chain include 11-hydroxypentadecanoic acid, 11-hydroxyhexadecanoic acid, hydrogenated castor oil fatty acids, and hydrolysates of lactones having a side chain.

Although not limited to the following examples, specific examples of the lactone having a side chain include γ-heptanolactone, γ-octanolactone, γ-nonalactone, γ-methyl-γ-decanolactone, α-methyl-γ-butyrolactone, γ-decanolactone, α-heptyl-γ-butyrolactone, γ-undecanolactone, γ-dodecanolactone, δ-octanolactone, δ-nonalactone, δ-decanolactone, δ-undecanolactone, δ-dodecanolactone, δ-tridecanolactone and δ-tetradecanolactone.

Among the various possibilities, the use of a hydrogenated castor oil polyol (A1) as the polyester polyol (A0) is particularly preferable from the viewpoints of pigment dispersibility and re-solubility. These may be used individually, or a mixture containing two or more types may be used.

Although not limited to the following method, the hydrogenated castor oil polyol (A1) can be obtained, for example, by subjecting a castor oil fatty acid (ricinoleic acid) obtained by hydrolysis of castor oil to an esterification reaction using a diol as an initiator, thus obtaining a castor oil polycondensate (castor oil polyol), and then performing a conventional hydrogenation reaction to hydrogenate the unsaturated groups. Further, the hydrogenated castor oil polyol (A1) can also be obtained by hydrogenating a castor oil fatty acid to obtain a hydrogenated castor oil fatty acid, and then performing an esterification using a diol as an initiator.

Although not limited to the following examples, specific examples of the diol include ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol, neopentyl glycol, 3-methyl-1,5-pentanediol, 2-methyl-1,3-propanediol, 3,3,5-trimethylpentanediol, 2,4-diethyl-1,5-pentanediol, 1,12-octadecanediol, 1,2-alkanediols, 1,3-alkanediols, 1-monoglycerides, 2-monoglycerides, 1-monoglycerol ethers, 2-monoglycerol ethers, dimer diols, and hydrogenated dimer diols.

These polyester polyol (A0) may be used individually, or mixtures containing two or more polyester polyols may be used.

The polyester polyol (A0) is used for the purpose of imparting pigment dispersibility to the polyurethane urea resin (D) within the medium containing the alcohol as the main component. The amount used of the polyester polyol (A0) is preferably within a range from 20 to 85% by weight, and more preferably within a range from 30 to 75% by weight, relative to a value of 100% by weight for the total polyol (A). When the amount used of the polyester polyol (A0) is not more than 85% by weight relative to a value of 100% by weight for the total polyol (A), the re-solubility is favorable, whereas when the amount used is at least 20% by weight, the pigment dispersibility is favorable.

In terms of the molecular weight of the polyester polyol (A0), the weight-average molecular weight is preferably from 500 to 4,000, and more preferably from 1,000 to 3,500. When the weight-average molecular weight is not more than 4,000, the solubility of the polyurethane urea resin (D) in the alcohol (F) is favorable, and when the weight-average molecular weight is at least 500, substrate adhesion is favorable in the printed materials.

The polyol (A) preferably also includes a polyether polyol (A2).

Although not limited to the following examples, specific examples of the polyether polyol (A2) include polyethylene glycol, polypropylene glycol, polytrimethylene glycol, polyoxytetramethylene glycol, and copolymer polyether diols of these compounds. These may be used individually, or mixtures containing two or more types may be used.

The polyether polyol (A2) is used for the purpose of improving the alcohol solubility of the polyurethane urea resin (D). The amount used of the polyether polyol (A2) is preferably within a range from 15 to 80% by weight, and more preferably from 25 to 70% by weight, relative to a value of 100% by weight for the total polyol (A). When the amount used of the polyether polyol (A2) is not more than 80% by weight relative to a value of 100% by weight for the total polyol (A), the pigment dispersibility is favorable, whereas when the amount used is at least 15% by weight, the re-solubility is favorable.

In terms of the molecular weight of the polyether polyol (A2), the weight-average molecular weight is preferably from 500 to 4,000, and more preferably from 1,000 to 3,000. When the weight-average molecular weight is not more than 4,000, the pigment dispersion stability is favorable, and when the weight-average molecular weight is at least 500, substrate adhesion is favorable in the printed materials.

Moreover, other known polyols besides the polyester polyol (A0) and the polyether polyol (A2) may be used in combination as the polyol (A) of the present invention. Although not limited to the following examples, specific examples of known polyols that may be used include high-molecular weight diols such as polyester polyols (A3) other than the aforementioned polyester polyol (A0) and polycarbonate diols, as well as low-molecular weight diols (A4) such as ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol and hydrogenated bisphenol A.

In this description, the term "low-molecular weight diol" means a diol which does not have a repeating unit within its structure.

The amount used of the low-molecular weight diol (A4) is preferably not more than 20% by weight, and more preferably 10% by weight or less, relative to a value of 100% by weight for the total polyol (A). When the amount used of the low-molecular weight diol is not more than 20% by weight, substrate adhesion is favorable in the printed materials.

Although not limited to the following examples, specific examples of the polyester polyol (A3) other than the aforementioned polyester polyol (A0) include condensates obtained by an esterification reaction between a dibasic acid and a diol, and polyester polyols such as caprolactone polymers, valerolactone polymers, methylvalerolactone polymers, lactic acid polymers and castor oil fatty acid polymers obtained using an aforementioned diol as an initiator.

Although not limited to the following examples, specific examples of the above dibasic acid include adipic acid, phthalic anhydride, isophthalic acid, terephthalic acid, maleic acid, fumaric acid, succinic acid, oxalic acid, malonic aid, pimelic acid, azelaic acid, sebacic acid, suberic acid, glutaric acid, 1,4-cyclohexyldicarboxylic acid, dimer acids, and hydrogenated dimer acids.

Examples of the diol include the same diols as those listed above within the description of the hydrogenated castor oil polyol (A1), but the diol is not limited to these diols.

Among the various possibilities, in terms of the pigment dispersion stability, the storage stability of the ink, and the transparency within the printed materials, a castor oil polyol such as a castor oil fatty acid polymer is particularly preferred as the polyester polyol (A3) other than the aforementioned polyester polyol (A0). These types of polyester polyols may be used individually, or a mixture containing two or more types may be used.

From the viewpoint of the pigment dispersion stability, the amount used of the polyester polyol (A3) other than the aforementioned polyester polyol (A0) is preferably not more than 35% by weight, and more preferably 25% by weight or less, relative to a value of 100% by weight for the total polyol (A).

Next is a description of the diisocyanate (B).

Although not limited to the following compounds, examples of the diisocyanate (B) include aromatic diisocyanates, aliphatic diisocyanates and alicyclic diisocyanates. Specific examples include 1,5-naphthylene diisocyanate, 4,4'-diphenylmethane diisocyanate (alternate name: MDI), 4,4'-diphenyldimethylmethane diisocyanate, 4,4'-dibenzyl isocyanate, dialkyldiphenylmethane diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, lysine diisocyanate, cyclohexane-1,4-diisocyanate, xylylene diisocyanate, isophorone diisocyanate, dimeryl diisocyanate, dicyclohexylmethane-4,4'-diisocyanate, 1,3-bis(isocyanatomethyl)cyclohexane, methylcyclohexane diisocyanate, norbornane diisocyanate, m-tetramethylxylylene diisocyanate, 4,4-diphenylmethane diisocyanate, tolylene diisocyanate, bis-chloromethyl-diphenylmethane diisocyanate, 2,6-diisocyanatobenzyl chloride, and dimer diisocyanates in which the carboxyl groups of a dimer acid have been converted to isocyanate groups. These diisocyanate compounds may be used individually, or mixtures containing two or more compounds may be used. Among the various possibilities, from the viewpoint of the alcohol solubility of the polyurethane urea resin (D), an alicyclic diisocyanate such as isophorone diisocyanate is preferable.

Next is a description of the chain extender (C).

There are no particular limitations on the chain extender (C), and examples include diamines and the diols mentioned above in the description of the hydrogenated castor oil polyol (A1). Although not limited to the following examples, specific examples of diamines that may be used include ethylenediamine, propylenediamine, hexamethylenediamine, diethylenetriamine, triethylenetetramine, isophoronediamine, dicyclohexylmethane-4,4'-diamine, and dimer diamines in which the carboxyl groups of a dimer acid have been converted to amino groups, as well as amines having a hydroxyl group within the molecule, such as N-(2-hydroxyethyl)ethylenediamine, N-(2-hydroxyethyl)propylenediamine, N-(2-hydroxypropyl)ethylenediamine, N-(2-hydroxypropyl)propylenediamine, N,N'-bis(2-hydroxyethyl)ethylenediamine, N,N'-bis(2-hydroxyethyl)propylenediamine, N,N'-bis(2-hydroxypropyl)ethylenediamine and N,N'-bis(2-hydroxypropyl)propylenediamine, and amines having a tertiary amino group within the molecule, such as methyliminobispropylamine and lauryliminobispropylamine.

These chain extenders may be used individually, or mixtures containing two or more chain extenders may be used.

Next is a description of the polyurethane urea resin (D).

There are no particular limitations on the method used for producing the polyurethane urea resin (D), and production may be performed using a typical polyurethane urea resin production method. For example, first the polyol (A) and the diisocyanate (B) are reacted without a solvent in an equivalence ratio that provides an excess of isocyanate groups relative to hydroxyl groups, thus producing a prepolymer containing isocyanate groups. Subsequently, this prepolymer is dissolved in ethyl acetate or an alcohol having a tertiary hydroxyl group to prepare a prepolymer solution. This isocyanate group-containing prepolymer solution is then added to a solution prepared by dissolving the chain extender (C) in a mixed solvent of the alcohol (F) and ethyl acetate to effect the chain extension reaction.

In the production of the prepolymer, the ratio between the polyol (A) and the diisocyanate (B) is adjusted so that the ratio between the number of moles of isocyanate groups in the diisocyanate (B) and the number of moles of hydroxyl groups in the polyol (A), namely the NCO/OH ratio, is preferably within a range 1.1 to 3.0, and more preferably from 1.5 to 2.5. When this ratio is at least 1.1, the urea group concentration within the obtained polyurethane urea resin is high, and as a result, the elasticity is high and satisfactory blocking resistance can be obtained in the printed materials. Further, when the NCO/OH ratio is not more than 3.0, substrate adhesion is favorable in the printed materials.

The polyurethane urea resin (D) has a weight-average molecular weight that is preferably within a range from 10,000 to 100,000, and more preferably from 15,000 to 50,000. When the weight-average molecular weight is at least 10,000, satisfactory blocking resistance can be ensured in the printed materials, and when the weight-average molecular weight is not more than 100,000, the solubility in the alcohol (F) in the present invention is favorable, meaning satisfactory pigment dispersibility can be obtained.

Moreover, in order to ensure good substrate adhesion, the polyurethane urea resin (D) preferably has amino groups at the terminals and/or within the main chain.

The amount of the amino groups preferably yields an amine value of 0.5 to 40.0 mgKOH/1 g of resin, and more preferably an amine value of 3.0 to 20.0 mgKOH/1 g of resin. When the amine value is at least 0.5 mgKOH/1 g of resin, the adhesion to polyolefin-based films in the printed materials is favorable, and when the amine value is not more than 40.0 mgKOH/1 g of resin, the storage stability of the ink is favorable.

The polyurethane urea resin (D) is preferably included in a proportion of 1 to 30% by weight, and more preferably 3 to 15% by weight, relative to the total weight of the printing ink composition.

Next is a description of the colorant (E).

For the colorant (E), any of the types of colorants typically used in inks can be used, including organic pigments, inorganic pigments, and dyes and the like.

Despite the fact that the alcohol-based printing ink composition of the present invention uses an alcohol as the main component of the medium, the composition exhibits excellent pigment dispersibility, not only for inorganic pigments, but also for organic pigments.

Although not limited to the following examples, specific examples of the organic pigment include carmine 6B, lake red C, permanent red 2B, disazo yellow, pyrazolone orange, carmine FB, cromophtal yellow, cromophtal red, phthalocyanine blue, phthalocyanine green, dioxazine violet, quinacridone magenta, quinacridone red, indanthrone blue, pyrimidine yellow, thioindigo bordeaux, thioindigo magenta, perylene red, perinone orange, isoindolinone yellow, aniline black, diketopyrrolopyrrole red, and daylight fluorescent pigment.

Examples of the C.I. Pigment Numbers of organic pigments that may be used include, but are not limited to, C.I. Pigment Blue 15:3, C.I. Pigment Yellow 14, C.I. Pigment Yellow 17, C.I. Pigment Yellow 83, C.I. Pigment Yellow 155, C.I. Pigment Red 48:1, C.I. Pigment Red 48:2, C.I. Pigment Red 48:3, C.I. Pigment Red 57:1, C.I. Pigment Red 144, C.I. Pigment Red 146, C.I. Pigment Red 166, C.I. Pigment Red 185, C.I. Pigment Red 220, C.I. Pigment Red 221, C.I. Pigment Red 242 and C.I. Pigment Black 7.

Although not limited to the following examples, specific examples of the inorganic pigment include carbon back, aluminum powder, bronze powder, chrome vermilion, chrome yellow, cadmium yellow, cadmium red, ultramarine blue, Prussian blue, red iron oxide, yellow iron oxide, iron black, titanium oxide, and zinc oxide.

Although not limited to the following examples, specific examples of the dye include tartrazine lake, rhodamine 6G lake, Victoria pure blue lake, alkali blue G toner, and brilliant green lake. Further, coal tar and the like can also be used.

Among the various possibilities, in terms of the water resistance and the like, an organic pigment or an inorganic pigment is preferably used.

Further, from the viewpoint of the blocking resistance, the alcohol-based printing ink composition of the present invention may also contain an extender pigment if required. Examples of the extender pigment include talc, calcium carbonate, kaolin, barium sulfate and various minerals a well as oxides, carbonates and sulfates of various metals, but excluding titanium oxide. These extender pigments may be used in combination with an organic pigment or an inorganic pigment.

When an extender pigment is used, the amount of the extender pigment is preferably from 1 to 10% by weight relative to the total weight of the printing ink composition. When the amount is at least 1% by weight, a satisfactory effect on the blocking resistance can be achieved, and when the amount is not more than 10% by weight, precipitation can be inhibited. The amount of the extender pigment is more preferably from 3 to 8% by weight relative to the total weight of the printing ink composition.

The colorant (E) is included in an amount that is sufficient to ensure satisfactory color density and coloring strength for the printing ink. In other words, the colorant (E) is preferably included in a proportion of 1 to 50% by weight, and more preferably 5 to 40% by weight, relative to the total weight of the printing ink composition. These colorants may be used individually, or combinations of two or more colorants may be used.

Next is a description of the alcohol (F).

The alcohol-based printing ink composition of the present invention contains the alcohol (F) in a proportion of at least 50% by weight relative to a value of 100% by weight for the total medium, and the composition exhibits favorable pigment dispersibility and re-solubility when the proportion of the alcohol (F) is within a range from 50% by weight to 100% by weight.

Although not limited to the following examples, specific examples of the alcohol (F) include aliphatic alcohols having 1 to 7 carbon atoms such as methanol, ethanol, n-propanol, isopropanol, n-butanol, isobutanol and tert-butanol, as well as glycol monoethers such as propylene glycol monomethyl ether, propylene glycol monoethyl ether, propylene glycol monopropyl ether, propylene glycol monoisopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether and tripropylene glycol monobutyl ether.

Among the above alcohols, from the viewpoints of lowering environmental impact and ensuring a high volatilization rate, the use of ethanol and/or isopropanol is preferable. Further, the proportion of ethanol and/or isopropanol is preferably at least 70% by weight relative to a value of 100% by weight for the total alcohol (F), and it is particularly desirable that the proportion of ethanol is at least 70% by weight relative to a value of 100% by weight for the total alcohol (F). These alcohols (F) can be used individually, or a mixture containing two or more alcohols may be used.

Moreover, when used in a flexographic printing application, it is necessary to prevent drying of the ink on the printing plate. Accordingly, from the viewpoint of printability, it is preferable that a glycol monoether is used in combination with the alcohol.

Next is a description of the water in the medium.

The alcohol-based printing ink composition of the present invention may also include water as the medium, for the purpose of enhancing the dispersion stability of the pigment. The amount of water included in the medium is preferably within a range from 2 to 20% by weight, and more preferably from 2 to 10% by weight, relative to a value of 100% by weight for the total medium. When the amount of water in the medium is not more than 20% by weight, the drying rate of the medium is rapid, and the production efficiency is high in the drying process for the printing ink. When the amount of water in the medium is at least 2% by weight, the pigment dispersion stability and the storage stability are favorable.

If necessary, the alcohol-based printing ink composition of the present invention may also include a solvent other than the alcohol (F) in the medium. Although not limited to the following solvents, specific examples of this other solvent include ketones such as acetone and methyl ethyl ketone, esters such as ethyl acetate and propyl acetate, and carbonate esters such as dimethyl carbonate. From the viewpoints of safety and the volatilization rate, the use of ethyl acetate is preferable.

From the viewpoint of the pigment dispersion stability, the amount of the medium relative to the total weight of the printing ink composition is preferably within a range from 20 to 98% by weight, and more preferably from 45 to 92% by weight.

There are no particular limitations on the method used for producing the alcohol-based printing ink composition of the present invention, and for example the composition can be prepared by mixing the polyurethane urea resin (D), the medium and the colorant (E), performing a pigment dispersion treatment using a dispersion device such as a sand mill to obtain a pigment dispersion as a precursor, and then diluting this precursor to obtain the alcohol-based printing ink composition.

The pigment dispersion treatment may be performed at a concentration that enables subsequent printing to be performed without further modification, but in terms of the pigment dispersibility, the color development properties and the production efficiency, the dispersion treatment is preferably performed under conditions where the concentration of the colorant (E) within 100% by weight of the pigment dispersion is preferably from 10 to 70% by weight, and more preferably from 20 to 50% by weight. After performing the above pigment dispersion treatment, the dispersion may be diluted with a resin and a medium and the like to obtain a concentration that facilitates long-term storage.

In the preparation of the alcohol-based printing ink composition of the present invention, various types of additives, including pigment derivatives, wetting agents, leveling agents, antifoaming agents, antistatic agents, anti-blocking agents, and dispersants such as vinyl chloride-vinyl acetate copolymers, may be used as required.

In particular, if required, anti-blocking agents such as cellulose acetate alkanoate resins and polyvinyl butyral resins may be used, either individually or in combinations containing two or more compounds, in the alcohol-based printing ink composition of the present invention.

In consideration of the compatibility with the polyurethane urea resin (D) that is used, the cellulose acetate alkanoate resin is preferably at least one of cellulose acetate propionate (CAP) and cellulose acetate butyrate (CAB), and the use of cellulose acetate propionate (CAP) is particularly desirable.

Cellulose acetate propionate is obtained by triesterification of cellulose with acetic acid and propionic acid, followed by hydrolysis. Cellulose acetate propionate is generally marketed commercially as a resin having an acetylation rate of 0.6 to 2.5% by weight, a propionylation rate of 42 to 46% by weight, and a hydroxyl group content of 1.8 to 5.0% by weight. In consideration of the compatibility with the urethane resin, the use of a cellulose acetate propionate resin having a propionyl group content of 40 to 50% by weight (median value 45%), an acetyl group content of 0.5 to 3.0% by weight (median value 2.5%), a hydroxyl group content of 2 to 6% by weight (median value 2.5%) and a viscosity of 0.05 to 0.2 Pa·s (as measured by the standard viscosity measurement method of ASTM Method D1343) is particularly preferable.

A polyvinyl butyral resin obtained by reacting a polyvinyl alcohol with butyraldehyde or formaldehyde, and then performing an acetalization may also be used. Preferable polyvinyl butyral resins for use in the alcohol-based printing ink composition of the present invention have an acetyl group content of not more than 3 mol %, a butyralation degree within a range from 60 to 80 and a hydroxyl group content of about 36% by weight, and preferably have a number-average molecular weight within a range from 10,000 to 50,000, and more preferably about 10,000 to 20,000.

When a cellulose acetate alkanoate resin or a polyvinyl butyral resin is used, the amount used of the resin preferably yields a resin solid fraction of about 0.5 to 10% by weight relative to the total weight of the printing ink composition. When this solid fraction is at least 0.5% by weight, the blocking resistance effect is satisfactory, and when the solid fraction is not more than 10% by weight, the coating film itself does not become overly hard, and the adhesion to films remains favorable. A more preferable resin solid fraction is from 1 to 5% by weight.

The alcohol-based printing ink composition of the present invention can be used as a printing ink in known printing methods such as gravure printing and flexographic printing.

EXAMPLES

The present invention is described below in further detail using a series of examples, but the following examples in no way limit the scope of the present invention. In the examples, the units "parts" and "%" indicate "parts by weight" and "% by weight" respectively.

The measurement methods used for measuring "resin solid fraction concentration", "viscosity", "amine value", "weight-average molecular weight" and "acid value" in the examples are described below.

Resin solid fraction concentration: measured in accordance with JIS K5601-1-2, wherein the heating residue measured after heating at a heating temperature of 150° C. for 20 minutes was recorded as the resin solid fraction concentration (%).

Viscosity: measured at 25° C. using a B-type viscometer (model BL, manufactured by Tokyo Keiki Inc.).

Amine value: calculated using a method in which about 3 g of the polyurethane urea resin solution was weighed into a flask and dissolved by adding 50 ml of methanol, a potentiometric titration of the resulting solution was performed using a 0.1 mol/l standard solution of hydrochloric acid, and the amine value was then calculated from the obtained neutralization point using the following formula (1).

$$\text{Amine value} = a \times f \times 5.61/(s \times w) \quad (1)$$

a: amount used of 0.1 mol/l of hydrochloric acid solution (ml)
f: titer of 0.1 mol/l of hydrochloric acid solution
s: polyurethane urea resin solution (g)
w: resin solid fraction concentration (%)

Weight average molecular weight: measured by a method in which a pretreatment was first performed by reacting all of the amino groups at both terminals of the polyurethane urea resin with α,α-dimethyl-3-isopropenylbenzyl isocyanate, and the polystyrene-equivalent weight-average molecular weight of the resulting product was then determined by gel permeation chromatography using a Shodex GPC LF-604 column (manufactured by Shodex corporation) and a GPC apparatus (GPC-104, manufactured by Shodex corporation) fitted with an RI detector, using THF as the developing solvent.

Acid value: measured in accordance with JIS K0070.

Synthesis Example 1

Preparation of Polyurethane Urea Resin (D-1)

A flask fitted with a stirrer, a thermometer, a reflux condenser and a nitrogen gas inlet was charged with 18 parts of a hydrogenated castor oil polyol (product name: "URIC PH-100", manufactured by Itoh Oil Chemicals Co., Ltd., hydroxyl value: 41.6 mgKOH/g, number-average molecular weight: 2697), 72 parts of a polypropylene glycol (hydroxyl value: 57.3 mgKOH/g, number-average molecular weight: 1958), 3.5 parts of 1,3-propanediol and 39.8 parts of isophorone diisocyanate, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.7 parts of isophoronediamine, 167.9 parts of ethyl acetate and 225 parts of ethanol, and the resulting mixture was then reacted for a further one hour to obtain a solution of a polyurethane urea resin (D-1).

The obtained solution of the polyurethane urea resin (D-1) had a resin solid fraction concentration of 25% by weight, a viscosity of 110 mPa·s (25° C.), an amine value for the resin solid fraction of 6.5 mgKOH/g resin, and a weight-average molecular weight of 35,000.

Synthesis Example 2

Preparation of Polyurethane Urea Resin (D-2)

A flask fitted with a stirrer, a thermometer, a reflux condenser and a nitrogen gas inlet was charged with 28.2 parts of the same hydrogenated castor oil polyol as Synthesis Example 1 (product name: "URIC PH-100"), 61.4 parts of a polypropylene glycol (hydroxyl value: 57.3 mgKOH/g, number-average molecular weight: 1958), 3.7 parts of 1,3-propanediol and 39.9 parts of isophorone diisocyanate, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.8 parts of isophoronediamine, 167.9 parts of ethyl acetate and 225 parts of ethanol, and the resulting mixture was then reacted for a further one hour to obtain a solution of a polyurethane urea resin (D-2).

The obtained solution of the polyurethane urea resin (D-2) had a resin solid fraction concentration of 25% by weight, a viscosity of 115 mPa·s (25° C.), an amine value for the resin solid fraction of 6.5 mgKOH/g resin, and a weight-average molecular weight of 38,000.

Synthesis Example 3

Preparation of Polyurethane Urea Resin (D-3)

A flask fitted with a stirrer, a thermometer, a reflux condenser and a nitrogen gas inlet was charged with 46.7 parts of the same hydrogenated castor oil polyol as Synthesis Example 1 (product name: "URIC PH-100"), 42.8 parts of a polypropylene glycol (hydroxyl value: 57.3 mgKOH/g, number-average molecular weight: 1958), 3.8 parts of 1,3-propanediol and 39.5 parts of isophorone diisocyanate, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.8 parts of isophoronediamine, 167.9 parts of ethyl acetate and 225 parts of ethanol, and the resulting mixture was then reacted for a further one hour to obtain a solution of a polyurethane urea resin (D-3).

The obtained solution of the polyurethane urea resin (D-3) had a resin solid fraction concentration of 25% by weight, a viscosity of 118 mPa·s (25° C.), an amine value for the resin solid fraction of 6.6 mgKOH/g resin, and a weight-average molecular weight of 33,000.

Synthesis Example 4

Preparation of Polyurethane Urea Resin (D-4)

A flask fitted with a stirrer, a thermometer, a reflux condenser and a nitrogen gas inlet was charged with 46.7 parts of the same hydrogenated castor oil polyol as Synthesis Example 1 (product name: "URIC PH-100"), 42.8 parts of a polytrimethylene glycol (product name: "Cerenol H2000", manufactured by DuPont, hydroxyl value: 57.3 mgKOH/g, number-average molecular weight: 1958), 3.8 parts of 1,3-propanediol and 39.9 parts of isophorone diisocyanate, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.8 parts of isophoronediamine, 167.9 parts of ethyl acetate and 225 parts of ethanol, and the resulting mixture was then reacted for a further one hour to obtain a solution of a polyurethane urea resin (D-4).

The obtained solution of the polyurethane urea resin (D-4) had a resin solid fraction concentration of 25% by weight, a viscosity of 125 mPa·s (25° C.), an amine value for the resin solid fraction of 6.5 mgKOH/g resin, and a weight-average molecular weight of 34,000.

Synthesis Example 5

Preparation of Polyurethane Urea Resin (D-5)

A flask fitted with a stirrer, a thermometer, a reflux condenser and a nitrogen gas inlet was charged with 28 parts of the same hydrogenated castor oil polyol as Synthesis Example 1 (product name: "URIC PH-100"), 18.6 parts of a castor oil polyol (product name: "URIC HF-2009", manufactured by Itoh Oil Chemicals Co., Ltd., hydroxyl value: 41.6 mgKOH/g, number-average molecular weight: 2697), 42.8 parts of a polytrimethylene glycol (product name: "Cerenol H2000", manufactured by DuPont, hydroxyl value: 57.3 mgKOH/g, number-average molecular weight: 1958), 3.8 parts of 1,3-propanediol and 39.9 parts of isophorone diisocyanate, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.8 parts of isophoronediamine, 167.9 parts of ethyl acetate and 225 parts of ethanol, and the resulting mixture was then reacted for a further one hour to obtain a solution of a polyurethane urea resin (D-5).

The obtained solution of the polyurethane urea resin (D-5) had a resin solid fraction concentration of 25% by weight, a viscosity of 100 mPa·s (25° C.), an amine value for the resin solid fraction of 6.5 mgKOH/g resin, and a weight-average molecular weight of 30,000.

Synthesis Example 6

Preparation of Polyurethane Urea Resin (D-6)

A flask fitted with a stirrer, a thermometer, a reflux condenser and a nitrogen gas inlet was charged with 26.6 parts of γ-nonalactone, 0.93 parts of 1,4-butanediol and 0.006 parts of tetrabutyl titanate, and the mixture was reacted at 200° C. for 24 hours to obtain a γ-nonalactone polymer (hydroxyl value: 43 mgKOH/g, number-average molecular weight: 2609).

Subsequently, following cooling of the flask, 61.8 parts of a polypropylene glycol (hydroxyl value: 57.3 mgKOH/g, number-average molecular weight: 1958), 3.7 parts of 1,3-propanediol and 40.2 parts of isophorone diisocyanate were added to the flask, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.9 parts of isophoronediamine, 167.9 parts of ethyl acetate and 225 parts of ethanol, and the resulting mixture was then reacted for a further one hour to obtain a solution of a polyurethane urea resin (D-6).

The obtained solution of the polyurethane urea resin (D-6) had a resin solid fraction concentration of 25% by weight, a viscosity of 89 mPa·s (25° C.), an amine value for the resin solid fraction of 5.1 mgKOH/g resin, and a weight-average molecular weight of 26,000.

Synthesis Example 7

Preparation of Polyurethane Urea Resin (K-1)

With the exception of replacing the 28.2 parts of the hydrogenated castor oil polyol used in Synthesis Example 2 with 28.2 parts of a castor oil polyol (product name: "URIC HF-2009", manufactured by Itoh Oil Chemicals Co., Ltd., hydroxyl value: 41.6 mgKOH/g, number-average molecular weight: 2697), the same operations as Synthesis Example 2 were performed. The obtained solution of the resulting polyurethane urea resin (K-1) had a resin solid fraction concentration of 25% by weight, a viscosity of 120 mPa·s (25° C.), an amine value for the resin solid fraction of 6.4 mgKOH/g resin, and a weight-average molecular weight of 34,000.

Synthesis Example 8

Preparation of Polyurethane Urea Resin (K-2)

With the exception of replacing the 46.7 parts of the hydrogenated castor oil polyol used in Synthesis Example 3 with 46.7 parts of a castor oil polyol (product name: "URIC HF-2009", manufactured by Itoh Oil Chemicals Co., Ltd., hydroxyl value: 41.6 mgKOH/g, number-average molecular weight: 2697), the same operations as Synthesis Example 3 were performed. The obtained solution of the resulting polyurethane urea resin (K-2) had a resin solid fraction concentration of 25% by weight, a viscosity of 110 mPa·s (25° C.), an amine value for the resin solid fraction of 6.4 mgKOH/g resin, and a weight-average molecular weight of 37,000.

Synthesis Example 9

Preparation of Polyurethane Urea Resin (K-3)

A flask fitted with a stirrer, a thermometer, a reflux condenser and a nitrogen gas inlet was charged with 46.6 parts of a polycondensate of adipic acid and 3-methyl-1,5-pentanediol (hydroxyl value: 56.1 mgKOH/g, number-average molecular weight: 2000), 43.4 parts of a polypropylene glycol (hydroxyl value: 57.3 mgKOH/g, number-average molecular weight: 2000), 3.4 parts of 1,3-propanediol and 39.9 parts of isophorone diisocyanate, and the resulting mixture was reacted under a stream of nitrogen at 100° C. for 6 hours to produce a urethane prepolymer.

Subsequently, 57.1 parts of ethyl acetate was added to the obtained urethane prepolymer to prepare a homogeneous solution of the urethane prepolymer. Next, this urethane prepolymer solution was added dropwise over a period of one hour to a mixture containing 16.7 parts of isophoronediamine, 167.9 parts of ethyl acetate and 225 parts of ethanol, and the resulting mixture was then reacted for a further one hour to obtain a solution of a polyurethane urea resin (K-3).

The obtained solution of the polyurethane urea resin (K-3) had a resin solid fraction concentration of 25% by weight, a viscosity of 150 mPa·s (25° C.), an amine value for the resin solid fraction of 6.5 mgKOH/g resin, and a weight-average molecular weight of 39,000.

The contents of each of the above polyurethane urea resin solutions are shown in Table 1. In Table 1, the "polyester polyol (A3) other than the polyester polyol (A0)" is recorded as "polyester polyol A3".

TABLE 1

|  | Polyol (A) | | | | |
|---|---|---|---|---|---|
|  | Polyester polyol A0 | Polyether polyol A2 | Polyester polyol A3 | Low-molecular weight diol A4 | Ratio A0/A2/A3/A4 |
| D-1 | hydrogenated castor oil polyol | PPG | — | PDO | 19/77/0/4 |
| D-2 | hydrogenated castor oil polyol | PPG | — | PDO | 30/66/0/4 |
| D-3 | hydrogenated castor oil polyol | PPG | — | PDO | 50/46/0/4 |
| D-4 | hydrogenated castor oil polyol | polytrimethylene glycol | — | PDO | 50/46/0/4 |
| D-5 | hydrogenated castor oil polyol | polytrimethylene glycol | castor oil polyol | PDO | 30/46/20/4 |
| D-6 | poly(γ-nonalactone) | PPG | — | PDO | 30/66/0/4 |
| K-1 | — | PPG | castor oil polyol | PDO | 0/66/30/4 |
| K-2 | — | PPG | castor oil polyol | PDO | 0/46/50/4 |
| K-3 | — | PPG | MPD/AA | PDO | 0/46/50/4 |

PPG: polypropylene glycol
PDO: 1,3-propanediol
MPD: 3-methyl-1,5-pentanediol
AA: adipic acid <Preparation of Printing Ink Precursors>

Examples 1 to 10 and Comparative Examples 1 to 5

The formulation of each printing ink composition is shown in Table 2.

First, a cyan pigment (C.I. Pigment Blue 15:3), a yellow pigment (C.I. Pigment Yellow 14) and a black pigment (C.I. Pigment Black 7) were prepared as the colorant (E), the solutions (hereafter referred to as "solution (D)") of the polyurethane urea resins (D-1) to (D-5) and (K-1) to (K-3) obtained in Synthesis Examples 1 to 5 and 7 to 9 were prepared as the polyurethane urea resin (D), a solution of a vinyl chloride-vinyl acetate copolymer (an ethyl acetate solution of "Solbin A", a registered trademark of Nissin Chemical Industry Co., Ltd., non-volatile fraction: 24%) was prepared as a dispersant, and water, ethanol and ethyl acetate were prepared as media.

In Comparative Example 5, which used the vinyl chloride-vinyl acetate copolymer, 10 parts by weight of the colorant (E) was mixed with 7.9 parts by weight of the solution (D), 4.7 parts by weight of the dispersant, 5.6 parts by weight of water, 8.9 parts by weight of ethanol, and 7.6 parts by weight of ethyl acetate.

When the vinyl chloride-vinyl acetate copolymer was not used, 10 parts by weight of the colorant (E) was mixed with 12.9 parts by weight of the solution (D), 0 parts by weight of the dispersant, 5.6 parts by weight of water, 16.3 parts by weight of ethanol, and 0 parts by weight of ethyl acetate.

Subsequently, each mixture was dispersed using a horizontal sand mill, and 41.7 parts by weight of the same solution (D) used in the dispersion and 7.5 parts by weight of ethanol were then added to prepare a printing ink precursor.

Example 11

The formulation of a printing ink composition is shown in Table 3.

First, 10 parts by weight of the colorant (E) was mixed with the solution of the polyurethane urea resin (D-4) obtained in Synthesis Example 4, a cellulose acetate propionate resin solution as an anti-blocking agent, water, ethanol and ethyl acetate to give concentrations of 7.9 parts by weight, 4.7 parts by weight, 5.6 parts by weight, 8.9 parts by weight and 7.6 parts by weight, respectively. This mixture was dispersed using a horizontal sand mill, and 41.7 parts by weight of the solution of the polyurethane urea resin (D-4) and 7.5 parts by weight of ethanol were then added to prepare a printing ink precursor.

For the cellulose acetate propionate resin, a product "CAP-482-0.5" manufactured by Eastman Chemical Company (non-volatile fraction: 20%, mixed solution of equal amount of isopropyl alcohol/ethyl acetate) was used.

Example 12

The formulation of a printing ink composition is shown in Table 3.

First, 10 parts by weight of the colorant (E) was mixed with the solution of the polyurethane urea resin (D-4) obtained in Synthesis Example 4, precipitated barium sulfate (an extender pigment), water, ethanol and ethyl acetate to give concentrations of 7.9 parts by weight, 3.0 parts by weight, 5.6 parts by weight, 8.9 parts by weight and 7.6 parts by weight, respectively. This mixture was dispersed using a horizontal sand mill, and 43.4 parts by weight of the solution of the polyurethane urea resin (D-4) and 7.5 parts by weight of ethanol were then added to prepare a printing ink precursor. A product "Bariace B-30", a registered trademark of Sakai Chemical Industry Co., Ltd., was used as the precipitated barium sulfate.

Example 13

The formulation of a printing ink composition is shown in Table 3.

First, 10 parts by weight of the colorant (E) was mixed with the solution of the polyurethane urea resin (D-6) obtained in Synthesis Example 6, water and ethanol to give concentrations of 12.9 parts by weight, 5.6 parts by weight and 16.3 parts by weight, respectively. This mixture was dispersed using a horizontal sand mill, and 41.7 parts by weight of the solution of the polyurethane urea resin (D-6) and 7.5 parts by weight of ethanol were then added to prepare a printing ink precursor.

<Preparation of Printing Ink Compositions>

For each of the printing ink precursors obtained in Examples 1 to 13 and Comparative Examples 1 to 5, 100 parts by weight of the precursor was diluted with 50 parts by weight of a dilution medium to prepare an alcohol-based printing ink composition of the present invention. The dilution medium used in each case was prepared so that the composition of the medium of the printing ink composition satisfied the medium composition (parts by weight) shown in Table 2 or Table 3.

In Tables 2 and 3, the weight ratio for the "medium composition" represents the weight ratio including the medium contained within the solution (D) and the medium used during preparation of the ink precursor.

Each of these prepared printing ink compositions was used in the following printing ink evaluations.

<Preparation of Printed Materials>

An impression cylinder made of a NBR (nitrile butadiene rubber) with a rubber hardness of 80 Hs, a ceramic-plated doctor blade having a blade tip thickness of 60 μm (base material thickness: 40 μm, thickness of ceramic layer on each side: 10 μm), an electronic engraving plate (stylus angle: 120 degrees, 250 lines/inch) having a chromium hardness of 1050 Hv, manufactured by Toyo Prepress Co., Ltd., and the obtained printing ink were installed in a gravure printing machine manufactured by Fuji Kikai Kogyo Co. Ltd.

The plate was preconditioned for 15 minutes by rotation at a doctor blade pressure of 2 kg/cm$^2$ and a rotational velocity of 100 m/minute, and the ink was then printed onto the corona-treated surface of a one-sided corona-treated OPP film "Pylen P2161" (manufactured by Toyobo Co., Ltd.) at a printing speed of 100 m/minute and a printing pressure of 2 kg/cm$^2$ for a period of 60 minutes, and the printed items were dried under hot air at 60° C. to obtain printed materials.

During printing, a constant viscosity was maintained by using a viscosity controller to perform appropriate replenishment of a mixed solvent having the medium composition shown in Table 2 or Table 3 but excluding the water.

<Evaluation of Printing Inks and Printed Materials>

The tests described below were performed on the printing inks and the obtained printed materials. The results are shown in Table 2.

(1) Dispersibility

Immediately following preparation, each of the printing inks was inspected for the presence or absence of separation and precipitates/aggregates, and evaluated against the following evaluation criteria.

◯: no separation or precipitates/aggregates.

×: separation and/or precipitates/aggregates.

(2) High-Temperature Storage Stability of Printing Ink

Each printing ink was stored at 40° C. for one week, and the rate of change in the viscosity, calculated by measuring the viscosity before and after storage, was evaluated against the following evaluation criteria. Measurement of the viscosity was performed at 25° C. using a B-type rotational viscometer.

◯: rate of change in the viscosity of less than 5%.

Δ: rate of change in the viscosity of at least 5% but less than 15%.

×: rate of change in the viscosity of 15% or greater.

(3) Re-Solubility

The state of the printed pattern at the start of printing and at the completion of printing, namely the amount of ink transferred to the image in the low cell depth portions (5 μm) of the printed material, was evaluated visually against the following evaluation criteria.

◯: the same color density was obtained at the start of printing and at the completion of printing.

Δ: a slight decrease in color density was observed at the completion of printing compared with the color density at the start of printing.

×: a large decrease in color density occurred at the completion of printing compared with the color density at the start of printing.

(4) Drying Properties

Under the same conditions as those described above for the re-solubility test, printing was performed with a gravure plate having cell depth portions of 25 μm, and the amount of residual solvent left on the printed material was measured using a gas chromatograph and then evaluated against the following evaluation criteria.

◯: amount of residual solvent of less than 1.0 mg/m$^2$.

◯Δ: amount of residual solvent of at least 1.0 mg/m$^2$, but less than 3.0 mg/m$^2$.

Δ: amount of residual solvent of at least 3.0 mg/m$^2$, but less than 5.0 mg/m$^2$.

(5) Overall Evaluation

Based on the results of the above evaluation items (1) to (4), an overall evaluation was determined using the following evaluation criteria.

◯: the performance is particularly superior.

◯Δ: the performance is satisfactory.

Δ: some limitations in terms of usage environment and applications, but still of a practically applicable level.

×: not of a usable level.

TABLE 2

| | Example | | Example 1 | Example 2 | Example 3 | Example 4 | Example 5 | Example 6 | Example 7 | Example 8 |
|---|---|---|---|---|---|---|---|---|---|---|
| Printing ink | Solution (D) | | D-1 | D-2 | D-3 | D-4 | D-5 | D-4 | D-4 | D-4 |
| | Vinyl chloride-vinyl acetate copolymer | | no | no | no | no | no | no | no | no |
| | Colorant (E) | | cyan pigment | cyan pigment | cyan pigment | cyan pigment | cyan pigment | cyan pigment | cyan pigment | cyan pigment |
| | Medium | Water | 8 | 8 | 8 | 8 | 8 | 8 | 8 | 20 |

TABLE 2-continued

| | | | | | | | | | | |
|---|---|---|---|---|---|---|---|---|---|---|
| | composition (weight ratio) | Ethanol | 50 | 50 | 50 | 50 | 50 | 92 | 34 | 50 |
| | | Isopropanol | 0 | 0 | 0 | 0 | 0 | 0 | 16 | 0 |
| | | Ethyl acetate | 42 | 42 | 42 | 42 | 42 | 0 | 42 | 30 |
| | | (Alcohol ratio in total medium) | 50% | 50% | 50% | 50% | 50% | 92% | 50% | 50% |
| | | (Water ratio in total medium) | 8% | 8% | 8% | 8% | 8% | 8% | 8% | 20% |
| | | (Ethanol ratio in total alcohol) | 100% | 100% | 100% | 100% | 100% | 100% | 68% | 100% |
| Evaluations | (1) Dispersibility | | ○ | ○ | ○ | ○ | ○ | ○ | ○ | ○ |
| | (2) High-temperature storage stability | | Δ | ○ | ○ | ○ | ○ | ○ | Δ | ○ |
| | (3) Re-solubility | | ○ | ○ | ○ | ○ | ○ | ○ | ○ | ○ |
| | (4) Drying rate | | ○ | ○ | ○ | ○ | ○ | ○Δ | ○ | Δ |
| | (5) Overall evaluation | | Δ | ○ | ○ | ○ | ○ | ○Δ | Δ | Δ |

| | Example | | Example 9 | Example 10 | Comparative Example 1 | Comparative Example 2 | Comparative Example 3 | Comparative Example 4 | Comparative Example 5 |
|---|---|---|---|---|---|---|---|---|---|
| Printing ink | Solution (D) | | D-4 | D-4 | D-4 | K-1 | K-2 | K-3 | K-3 |
| | Vinyl chloride-vinyl acetate copolymer | | no | no | no | no | no | no | yes |
| | Colorant (E) | | yellow pigment | black pigment | cyan pigment | cyan pigment | cyan pigment | cyan pigment | cyan pigment |
| | Medium composition (weight ratio) | Water | 8 | 8 | 8 | 8 | 8 | 8 | 8 |
| | | Ethanol | 50 | 50 | 40 | 50 | 50 | 50 | 50 |
| | | Isopropanol | 0 | 0 | 0 | 0 | 0 | 0 | 0 |
| | | Ethyl acetate | 42 | 42 | 52 | 42 | 42 | 42 | 42 |
| | | (Alcohol ratio in total medium) | 50% | 50% | 40% | 50% | 50% | 50% | 50% |
| | | (Water ratio in total medium) | 8% | 8% | 8% | 8% | 8% | 8% | 8% |
| | | (Ethanol ratio in total alcohol) | 100% | 100% | 100% | 100% | 100% | 100% | 100% |
| Evaluations | (1) Dispersibility | | ○ | ○ | Δ | Δ | Δ | X | ○ |
| | (2) High-temperature storage stability | | ○ | ○ | X | X | X | — | ○ |
| | (3) Re-solubility | | ○ | ○ | X | X | X | — | X |
| | (4) Drying rate | | ○ | ○ | ○ | ○ | ○ | — | ○ |
| | (5) Overall evaluation | | ○ | ○ | X | X | X | X | X |

Note, if the dispersibility was poor, then the evaluations (2) to (4) were not performed.

TABLE 3

| | Example | | Example 11 | Example 12 | Example 13 |
|---|---|---|---|---|---|
| Printing ink | Solution (D) | | D-4 | D-4 | D-6 |
| | Vinyl chloride-vinyl acetate copolymer | | no | no | no |
| | Cellulose acetate propionate resin | | yes | no | no |
| | Extender pigment | | no | yes | no |
| | Colorant (E) | | cyan pigment | cyan pigment | cyan pigment |
| | Medium composition (weight ratio) | Water | 8 | 8 | 8 |
| | | Ethanol | 50 | 50 | 50 |
| | | Isopropanol | 3 | 0 | 0 |
| | | Ethyl acetate | 37 | 39 | 42 |
| | | (Alcohol ratio in total medium) | 54% | 52% | 50% |
| | | (Water ratio in total medium) | 8% | 8% | 8% |
| | | (Ethanol ratio in total alcohol) | 94% | 100% | 100% |
| Evaluations | (1) Dispersibility | | ○ | ○ | ○ |
| | (2) High-temperature storage stability | | ○Δ | ○ | Δ |
| | (3) Re-solubility | | ○ | ○ | Δ |
| | (4) Drying rate | | ○ | ○ | ○ |
| | (5) Overall evaluation | | ○ | ○ | Δ |

INDUSTRIAL APPLICABILITY

The present invention is able to provide a printing ink composition which comprises an alcohol as the main component of the medium, exhibits excellent colorant dispersibility and storage stability, and has excellent re-solubility during long runs.

The invention claimed is:

1. An alcohol-containing printing ink composition comprising a colorant (E), a medium and a polyurethane urea resin (D) obtained by reacting a polyol (A), a diisocyanate (B) and a chain extender (C), wherein
the medium comprises an alcohol (F), wherein a proportion of the alcohol (F) is at least 50% by weight relative to a value of 100% by weight for the total medium,
the polyol (A) includes a polyester polyol (A0), and
the polyester polyol (A0) includes a hydrogenated castor oil polyol (A1) consisting of subunits including two or more units derived from a castor oil fatty acid or a hydrogenated castor oil fatty acid, wherein said two or more units are bound directly to each other via an ester bond, and a unit derived from a diol, and
the hydrogenated castor oil polyol (A1) has a side chain having a carbon number of 6.

2. The alcohol-containing printing ink composition according to claim 1, wherein the polyol (A) further comprises a polyether polyol (A2).

3. The alcohol-containing printing ink composition according to claim 1, wherein a proportion of the polyester polyol (A0) is from 20 to 85% by weight relative to a value of 100% by weight for the total polyol (A).

4. The alcohol-containing printing ink composition according to claim 1, wherein the alcohol (F) comprises ethanol, and a proportion of the ethanol is at least 70% by weight relative to a value of 100% by weight for the total alcohol (F).

5. The alcohol-containing printing ink composition according to claim 1, wherein the medium comprises water, and a proportion of water is from 2 to 20% by weight relative to a value of 100% by weight for the total medium.

6. The alcohol-containing printing ink composition according to claim 1, wherein the amount of medium relative to the total weight of the printing ink composition ranges from 20 to 98% by weight.

7. The alcohol-containing printing ink composition according to claim 1, wherein the amount of medium relative to the total weight of the printing ink composition ranges from 45 to 98% by weight.

8. The alcohol-containing printing ink composition according to claim 1, wherein colorant (E) comprises an organic pigment.

9. The alcohol-containing printing ink composition according to claim 1, wherein colorant (E) comprises an inorganic pigment.

10. The alcohol-containing printing ink composition according to claim 1, wherein colorant (E) comprises a dye.

11. A method for making the alcohol-containing printing ink composition of claim 1 comprising mixing polyethylene urea resin (D), the medium and the colorant (E) to form the alcohol-containing printing ink composition.

12. The method of claim 11, wherein colorant (E) comprises a pigment that is dispersed using a pigment dispersion device to form a pigment dispersion, and diluting the pigment dispersion to obtain the alcohol-containing printing ink composition.

13. The method of claim 12, wherein the pigment dispersion device is a sandmill.

14. A method of printing comprising applying the alcohol-containing printing ink composition of claim 1 to paper or other substrate.

15. A printed product to which the alcohol-containing printing ink composition of claim 1 has been applied.

16. An alcohol-containing printing ink composition comprising a colorant (E), a medium and a polyurethane urea resin (D) obtained by reacting a polyol (A), a diisocyanate (B) and a chain extender (C), wherein
the medium comprises an alcohol (F), wherein a proportion of the alcohol (F) is at least 50% by weight relative to a value of 100% by weight for the total medium,
the polyol (A) includes a polyester polyol (A0), and
the polyester polyol (A0) includes a hydrogenated castor oil polyol (A1), the hydrogenated castor oil polyol (A1) is at least one selected from the group consisting of
a reaction product (i) prepared by a method including subjecting a castor oil fatty acid to an esterification reaction using a diol as an initiator, and then performing a hydrogenation reaction, and including two or more units derived from the castor oil fatty acid bound directly to each other via an ester bond and a single unit derived from the diol within each molecule, and
a reaction product (ii) prepared by a method including hydrogenating a castor oil fatty acid to obtain a hydrogenated castor oil fatty acid, and then performing an esterification reaction using a diol as an initiator, and including two or more units derived from the hydrogenated castor oil fatty acid bound directly to each other via an ester bond and a single unit derived from the diol within each molecule, and
the hydrogenated castor oil polyol (A1) has a side chain having a carbon number of 6.

17. An alcohol-containing printing ink composition comprising a colorant (E), a medium and a polyurethane urea resin (D) obtained by reacting a polyol (A), a diisocyanate (B) and a chain extender (C), wherein
the medium comprises an alcohol (F), wherein a proportion of the alcohol (F) is at least 50% by weight relative to a value of 100% by weight for the total medium,
the polyol (A) includes a polyester polyol (A0),
the polyester polyol (A0) includes a hydrogenated castor oil polyol (A1) consisting of repeating units derived from a castor oil fatty acid or a hydrogenated castor oil fatty acid and a unit derived from a diol, and
the hydrogenated castor oil polyol (A1) has a side chain having a carbon number of 6.

18. An alcohol-containing printing ink composition comprising a colorant (E), a medium and a polyurethane urea resin (D) obtained by reacting a polyol (A), a diisocyanate (B) and a chain extender (C), wherein
the medium comprises an alcohol (F), wherein a proportion of the alcohol (F) is at least 50% by weight relative to a value of 100% by weight for the total medium,
the polyol (A) includes a polyester polyol (A0),
the polyester polyol (A0) includes a hydrogenated castor oil polyol (A1), the hydrogenated castor oil polyol (A1) is at least one selected from the group consisting of
a reaction product (i) prepared by a method including subjecting a castor oil fatty acid to an esterification reaction using a diol as an initiator, and then performing a hydrogenation reaction, and including two or more repeating units derived from the castor oil fatty acid and a single unit derived from the diol within each molecule, and a reaction product (ii) prepared by a method including hydrogenating a castor oil fatty acid to obtain a hydrogenated castor oil fatty acid, and then performing an esterification reaction using a diol as an initiator, and including two or more repeating units derived from the hydrogenated castor oil fatty acid and a single unit derived from the diol within each molecule, and the hydrogenated castor oil polyol (A1) has a side chain having a carbon number of 6.

* * * * *